United States Patent
Sun et al.

(10) Patent No.: US 10,574,134 B1
(45) Date of Patent: Feb. 25, 2020

(54) THREE-PHASE FREQUENCY CONVERTER, AND DEAD ZONE COMPENSATION CIRCUIT AND DEAD ZONE COMPENSATION METHOD FOR THE SAME

(71) Applicant: Delta Electronics, Inc., Taoyuan (TW)

(72) Inventors: Wei Sun, Taoyuan (TW); Wenjiang Zhao, Taoyuan (TW); Yongqiang Lang, Taoyuan (TW); Peter Mantovanelli Barbosa, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/390,016

(22) Filed: Apr. 22, 2019

(30) Foreign Application Priority Data

Aug. 1, 2018 (CN) .......................... 2018 1 0861502

(51) Int. Cl.
*H02M 1/38* (2007.01)
*H02M 5/04* (2006.01)
(52) U.S. Cl.
CPC .............. *H02M 1/38* (2013.01); *H02M 5/04* (2013.01); *H02M 2001/385* (2013.01)
(58) Field of Classification Search
CPC ..................................................... H02M 1/38
See application file for complete search history.

(56) References Cited

U.S. PATENT DOCUMENTS

| 2017/0003348 A1* | 1/2017 | Fedigan | ............... G01R 31/343 |
| 2019/0058395 A1* | 2/2019 | Tayebi | ..................... H02M 1/14 |
| 2019/0190421 A1* | 6/2019 | Shigeta | ................... H02M 7/48 |

FOREIGN PATENT DOCUMENTS

| CN | 100574091 C | 12/2009 |
| CN | 102739093 B | 5/2016 |

* cited by examiner

*Primary Examiner* — Jue Zhang
*Assistant Examiner* — Trinh Q Dang
(74) *Attorney, Agent, or Firm* — CKC & Partners Co., LLC

(57) ABSTRACT

A dead zone compensation circuit includes: a coordinate transformation module configured to perform a coordinate transformation on three-phase output currents of the three-phase frequency converter based on a given angle, for transforming the three-phase output currents from a three-phase static coordinate to a two-phase rotary coordinate to obtain a reactive current component of the three-phase output currents; a filter module configured to obtain a reactive current fluctuation amount; an error calculation module configured to calculate an error between the reactive current fluctuation amount and a zero value; a regulation and control module configured to regulate and control the reactive current fluctuation amount based on the error, for obtaining a voltage regulation variation; and a summing module configured to add the voltage regulation variation to a reference voltage, for obtaining a regulated voltage, the regulated voltage being used to generate a driving signal for the three-phase frequency converter.

12 Claims, 2 Drawing Sheets

THREE-PHASE FREQUENCY CONVERTER, AND DEAD ZONE COMPENSATION CIRCUIT AND DEAD ZONE COMPENSATION METHOD FOR THE SAME

CROSS-REFERENCE TO RELATED APPLICATIONS

This non-provisional application claims priority under 35 U.S.C. § 119(a) on Patent Application No. 201810861502.1 filed in P.R. China on Aug. 1, 2018, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The present invention relates to a frequency converter, and a circuit and a method for the same, and in particular, relates to a three-phase frequency converter, and a dead zone compensation circuit and a dead zone compensation method for the same.

2. Related Art

In a three-phase frequency converter, in order to prevent two power devices in the same bridge arm (such as, upper and lower switches in one bridge arm of a power module) from being turned on simultaneously to form a DC short circuit, an ON-pulse delay time, which is also called as "a dead zone time", is incorporated into a driving signal for the power device. The incorporation of the dead zone time may prevent a direct connection between the upper and lower switches. However, it may also result in an output voltage of the frequency converter that is no longer an ideal given voltage in the design and includes a nonlinear distortion. Accordingly, an oscillation is generated in an output current of the frequency converter, bringing negative effects, such as torque pulsation or the like, to the driven motor.

In order to suppress the current oscillation brought by the dead zone time, the frequency converter generally adopts dead zone compensation measures. Presently, there are mainly two dead zone compensation methods that are widely used. One is a time compensation method, i.e., directly adjusting ON/OFF time of driving pulses. Specifically, this method determines whether the ON time of a switch is prolonged or shortened depending on a polarity of a current that is flowing through the switch. With respect to a fixed dead zone time $t_d$, the time period by which the ON time is prolonged or shortened duration is fixed. The other method is a voltage compensation method, i.e., adding a certain voltage compensation amount to an amplitude of a modulated wave. The voltage compensation amount varies depending on a polarity of an output current. However, both of the above two methods adopt an open-loop manner, and suffer from the same drawbacks as below.

(1) The frequency converter is implemented depending on different modulation manners. Therefore, specific frequency converters have to be designed independently with respect to a Sine Pulse Width Modulation (SPWM) and a Space Vector Modulation (SVPWM).

(2) When the dead zone time of the frequency converter varies, the compensation time or the voltage compensation amount value needs to be changed.

(3) Both those methods depend on a determination of the polarity of the current. However, in the determination of the polarity of the current, there may be problem of inaccurate zero-crossing detection, which may affect accuracy of compensation.

(4) There may be a number of combinations of the polarities of the three-phase output current of the frequency converter. Independent processes have to be applied to each combination, which increases complexity.

Alternatively, in the prior art, the oscillation may be eliminated by using a closed-loop current method. This method detects a reactive current of a motor, measures an actual value of the reactive current in a non-oscillating region as a target value for controlling, and controls the reactive current to be always the target value through a closed loop. However, this method also suffers from drawbacks as below.

(1) This method depends on a detected value of the reactive current in the non-oscillating region. A distortion in the detected value may lead to an error in distribution amount of the reactive current of the motor, which cannot be compensated.

(2) In some dynamic situations, there may be deviations in decomposition of a reactive current components and an active current component. In such a case, the "reactive current" could not be controlled to be constant accurately, which may affect response in the dynamic situations.

As can be seen, conventional methods have certain shortcomings in aspects of universal applicability, accuracy and simplicity.

SUMMARY OF THE INVENTION

In view of above, an object of the present invention is to provide a three-phase frequency converter, and a dead zone compensation circuit and a dead zone compensation method for the same which has universal applicability, is capable of inhibiting negative effects of the current oscillation in the motor caused by the dead zone time, and improves stability of operations of the motor.

In order to achieve the above object, one aspect of the present invention provides a dead zone compensation circuit for a three-phase frequency converter, comprising: a coordinate transformation module configured to perform a coordinate transformation on three-phase output currents of the three-phase frequency converter based on a given angle, for transforming the three-phase output currents from a three-phase static coordinate to a two-phase rotary coordinate so as to obtain a reactive current component of the three-phase output currents; a filter module configured to obtain a reactive current fluctuation amount, including: a low-pass filter for performing a low-pass filtering on the reactive current component to filter out noise in the reactive current component; and a high-pass filter for performing a high-pass filtering on the reactive current component to filter out a direct current part of the reactive current component; an error calculation module configured to calculate an error between the reactive current fluctuation amount and a zero value; a regulation and control module configured to regulate and control the reactive current fluctuation amount based on the error, for obtaining a voltage regulation variation; and a summing module configured to add the voltage regulation variation to a reference voltage, for obtaining a regulated voltage, the regulated voltage being used to generate a driving signal for the three-phase frequency converter.

In order to achieve the above object, another aspect of the present invention provides a dead zone compensation method for a three-phase frequency converter, comprising: a coordinate transformation step for performing a coordinate transformation on three-phase output currents of the three-phase frequency converter based on a given angle, so as to transform the three-phase output currents from a three-phase static coordinate to a two-phase rotary coordinate, thereby obtaining a reactive current component in the three-phase output currents; a filtering step for performing a low-pass filtering and a high-pass filtering on the reactive current component so as to obtain a reactive current fluctuation amount; an error calculation step for calculating an error between the reactive current fluctuation amount and a zero value; a regulation and control step for performing regulation and control on the reactive current fluctuation amount based on the error so as to obtain a voltage regulation variation; and a summing step for adding the voltage regulation variation to a reference voltage so as to obtain a regulated voltage, the regulated voltage being used to generate a driving signal for the three-phase frequency converter.

In order to achieve the above object, still another aspect of the present invention provides a three-phase frequency converter including the dead zone compensation circuit as above.

The dead zone compensation circuit/method according to the present invention may suppress negative effects of the current oscillation in the motor caused by the dead zone time, and improve stability of operations of the motor. Different from the conventional time compensation method and voltage compensation method, the present invention uses a closed-loop manner, with advantages of universal applicability, easily implemented, and eliminating need of determination in current polarity. Further, compared to the conventional closed-loop current method, it is unnecessary for the present invention to detect the reactive current in advance, which is easily implemented, and is less affected by the detection error.

As compared to the prior art, the dead zone compensation circuit/method according to the present invention has the following advantages.

(1) The dead zone compensation circuit according to the present invention is provided preceding a modulation module, and thus applicable to any modulation manners (including SPWM, SVPWM, etc.).

(2) The dead zone compensation circuit/method according to the present invention is applicable to any dead zone time $t_d$.

(3) The dead zone compensation circuit/method according to the present invention is not dependent on the polarity of current output current, which avoids the difficulty in determination of the current polarity, and is not dependent on the accuracy of the zero-crossing detection.

(4) The dead zone compensation circuit/method according to the present invention does not need to perform a zone-divided determination depending on the three-phase current. Therefore, the processing method is uniformed, and is easily implemented.

(5) The dead zone compensation circuit/method according to the present invention may also suppress oscillations and fluctuations in the reactive current caused by other reasons.

Detailed descriptions will be provided below with reference to the embodiments, to provide further explanation for the technical solutions according to the present invention.

BRIEF DESCRIPTION OF THE DRAWINGS

To clarify other objects, features, advantages and embodiments of the present invention, the drawings are explained as follows.

DETAILED DESCRIPTION OF THE INVENTION

Figure 1:
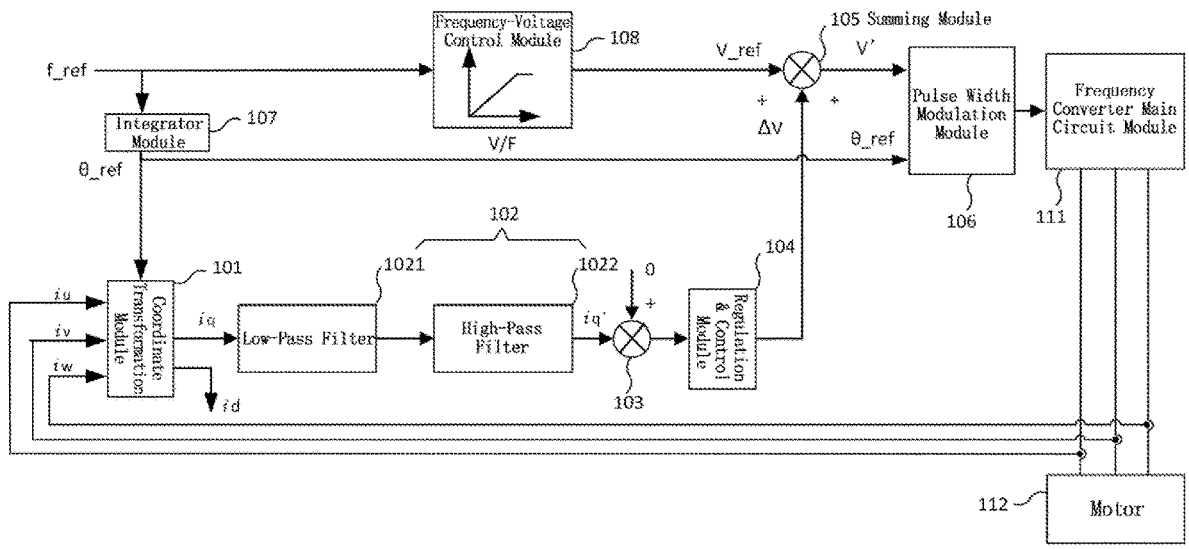
FIG. 1 is a block diagram showing a preferable embodiment of the three-phase frequency converter and the dead zone compensation circuit for the same according to the present invention.

The present invention is further described with reference to the appended drawings and various embodiments below so as to explain it explicitly and completely. Like number in the drawings represents like component. On the other hand, some well known components and steps are not described in the embodiments so as to avoid unnecessary limitation to the present invention. In addition, to simplify the drawings, some well known structures and elements are shown in the drawings in a simple and schematic way.

The present invention mainly uses a closed-loop current method to compensate a dead zone in a frequency converter, i.e., performing a coordinate transformation on three-phase output currents, extracting a reactive current component, controlling to eliminate fluctuation parts in the reactive current component so as to suppress oscillation in the output currents caused by the dead zone time, which may smooth an the output currents and reduce torque pulsation.

A three-phase frequency converter, and a dead zone compensation circuit and a dead zone compensation method for the same according to the present invention will be explained below with reference to FIGS. 1-3.

FIG. 1 illustrates a block diagram showing a preferable embodiment of the three-phase frequency converter and the dead zone compensation circuit for the same according to the present invention. In this embodiment, the three-phase frequency converter comprises the dead zone compensation circuit for compensating the dead zone. The dead zone compensation circuit includes a coordinate transformation module 101, a filter module 102, an error calculation module 103, a regulation and control module 104 and a summing module 105, which are electrically connected in this order.

The coordinate transformation module 101 is configured to perform a coordinate transformation on three-phase output currents iu, iv, iw of the three-phase frequency converter based on a given angle θ_ref, for transforming them from a three-phase static coordinate to a two-phase rotary coordinate so as to obtain a reactive current component iq of the three-phase output currents iu, iv, iw.

The filter module 102 is configured to obtain a reactive current fluctuation amount iq'. The filter module 102 may include a low-pass filter 1021 and a high-pass filter 1022. The low-pass filter 1021 performs a low-pass filtering on the reactive current component iq to filter out noises in the reactive current component iq. The high-pass filter 1022 performs a high-pass filtering on the reactive current component iq to filter out a direct current part of the reactive current component iq, thereby obtaining the reactive current fluctuation amount iq'.

The error calculation module 103 is configured to calculate an error between the reactive current fluctuation amount iq' and a zero value "0". Specifically, the error calculation module 103, for example, may be a subtracter.

The regulation and control module 104 is configured to regulate and control the reactive current fluctuation amount iq' based on the error, for obtaining a voltage regulation variation ΔV. Specifically, the regulation and control module 104, for example, may include a proportional control module for performing a proportional control on the reactive current fluctuation amount iq' based on the error.

The summing module 105 is configured to add the voltage regulation variation ΔV to a reference voltage V_ref, for obtaining a regulated voltage V'. The regulated voltage V' may be used to generate a driving signal for the three-phase frequency converter. Specifically, the summing module 105, for example, may be an adder.

In this embodiment, the three-phase frequency converter of the present invention further comprises a pulse width modulation (PWM) module 106, an integrator module 107, a frequency-voltage control module 108 and a frequency converter main circuit module 111. The integrator module 107 is electrically connected to the coordinate transformation module 101 for converting a reference frequency f ref to the given angle θ_ref. The frequency-voltage control module 108 is electrically connected to the summing module 105 for converting the reference frequency f ref to obtain the reference voltage V_ref. The PWM module 106 is electrically connected to the summing module 105 and the integrator module 107 for performing a pulse width modulation on the regulated voltage V' and the given angle θ_ref. After the modulation, the driving signal, which is generated based on the regulated voltage V' as mentioned above, is outputted to the frequency converter main circuit module 111. The frequency converter main circuit module 111 is electrically connected to a motor 112 for driving the motor 112.

Figure 3:
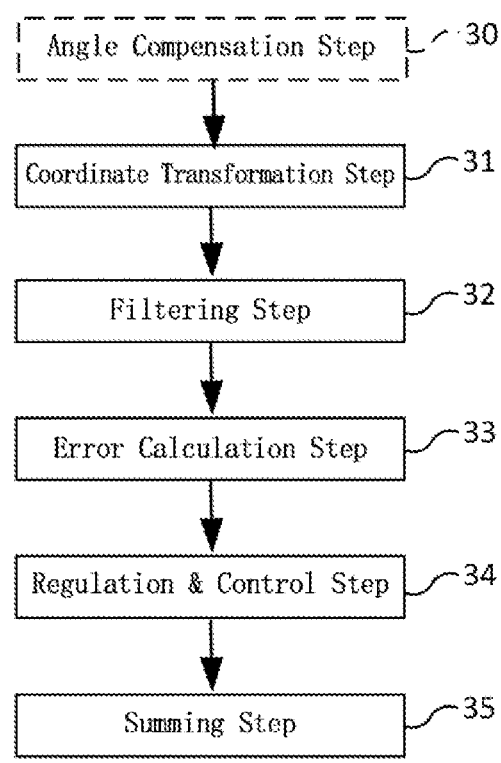
FIG. 3 is a flow diagram of a dead zone compensation method which may be performed in the three-phase frequency converter and the dead zone compensation circuit shown in FIG. 1 or FIG. 2 according to the present invention.

FIG. 3 illustrates a flow diagram of a dead zone compensation method which may be performed in the three-phase frequency converter and the dead zone compensation circuit shown in FIG. 1. The dead zone compensation method mainly comprises the following steps.

Step 31 is a coordinate transformation step. Specifically, three-phase output currents iu, iv, iw may be obtained through sampling in the three-phase frequency converter. Then, in Step 31, a coordinate transformation may be performed on the three-phase output currents iu, iv, iw based on the given angle θ_ref in the coordinate transformation module 101, so as to transform them from a three-phase static coordinate to a two-phase rotary coordinate. Here, as mentioned above, the given angle θ_ref is obtained by converting the reference frequency f ref through the integrator module 107. After Step 31, an active current component id and the reactive current component iq in the three-phase output currents iu, iv, iw may be separated. The separated reactive current component iq is in a direct current form.

Step 32 is a filtering step. Specifically, in Step 32, high frequency interference signals, such as additional switching noises, in the reactive current component iq separated in Step 31 may be filtered out through the low-pass filter 1021. Further, the direct current part of the reactive current component iq may be filtered out through the high-pass filter 1022, thereby obtaining the reactive current fluctuation amount iq'.

Step 33 is an error calculation step. Specifically, in Step 33, an error calculation may be performed by the error calculation module 103 for calculating an error between the reactive current fluctuation amount iq' and the zero value "0".

Step 34 is a regulation and control step. Specifically, in Step 34, the reactive current fluctuation amount iq' may be regulated and controlled based on the error calculated in Step 33 in the regulation and control module 104, which, for example, is a proportional control module, for obtaining the voltage regulation variation ΔV.

Step 35 is a summing step. Specifically, in Step 35, the voltage regulation variation ΔV may be added to a reference voltage V_ref (i.e., a voltage amplitude of a original modulated wave) in the summing module 105, for obtaining the regulated voltage V'. As mentioned above, the regulated voltage V' may be used to generate the driving signal for the three-phase frequency converter. For example, the driving signal may be modulated by the pulse width modulation module 106 to generate a modulated driving signal. The modulated driving signal may be outputted to the frequency converter main circuit module 111.

Figure 2:
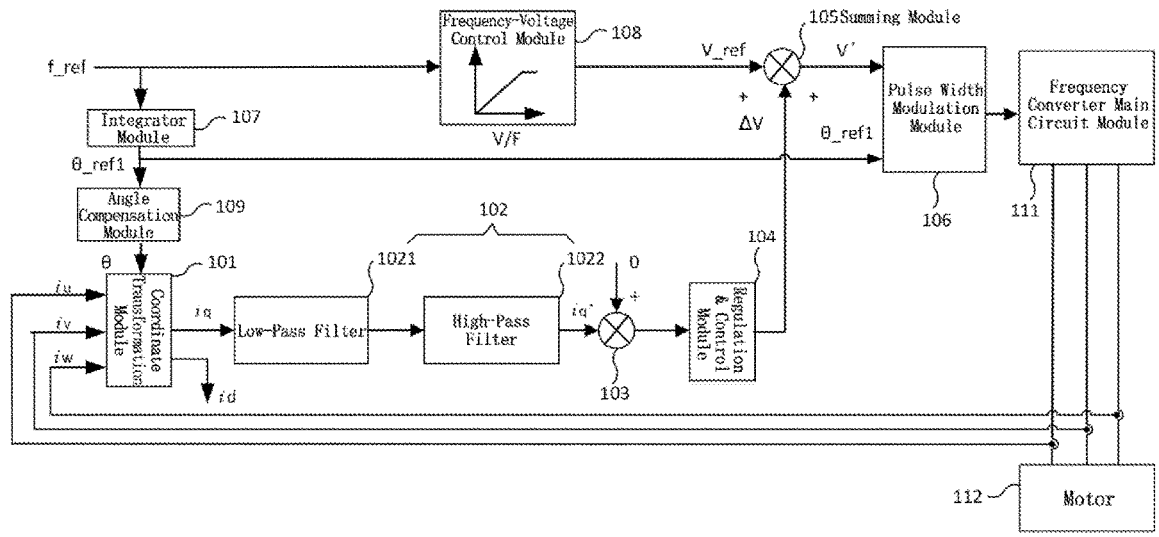
FIG. 2 is a block diagram showing another preferable embodiment of the three-phase frequency converter and the dead zone compensation circuit for the same according to the present invention.

FIG. 2 illustrates a block diagram showing another preferable embodiment of the three-phase frequency converter and the dead zone compensation circuit for the same according to the present invention. This embodiment differs from that shown in FIG. 1 in that an angle compensation module 109 is further included in the dead zone compensation circuit in this embodiment, on the basis of the embodiment shown in FIG. 1. The angle compensation module 109 is electrically connected between the integrator module 107 and the coordinate transformation module 101, for performing an angle compensation on a reference angle θ_ref1 so as to obtain a compensated angle θ. The angle θ_ref1 to be compensated by the angle compensation module 109 may be a difference between an angle of an instruction voltage vector and an angle of an actual output voltage vector of the three-phase frequency converter. The compensated angle θ is used as the given angle θ_ref in the embodiment shown in FIG. 1.

The coordinate transformation module 101 performs the coordinate transformation on three-phase output currents iu, iv, iw of the three-phase frequency converter based on the compensated angle θ. In this embodiment, since there is a delay between an instruction voltage and an actual output voltage of the three-phase frequency converter, the angle of the instruction voltage vector leads the angle of the actual output voltage vector. Accordingly, in this embodiment, the accuracy for extracting the reactive current component iq may be further improved by compensating for the angle through the angle compensation module 109 and performing the coordinate transformation based on the compensated angle.

Further, referring to FIG. 3 again, a dead zone compensation method which may be performed in the three-phase frequency converter and the dead zone compensation circuit shown in FIG. 2 may comprise Steps 31 to 35 as described above, and a Step 30 before the coordinate transformation step (i.e., Step 31).

Step 30 is an angle compensation step (as surrounded by a dotted block in FIG. 3), which mainly performs an angle compensation on the reference angle θ_ref1 so as to obtain the compensated angle θ, and provides it to the subsequent Step 31 (i.e., the coordinate transformation step), where the coordinate transformation may be performed based on the compensated angle θ.

The dead zone compensation circuit/method according to the present invention may suppress negative effects of the current oscillation in the motor caused by the dead zone time, and improve stability of operations of the motor. Different from the conventional time compensation method and voltage compensation method, the present invention uses a closed-loop manner, with advantages of universal applicability, easily implemented, and eliminating need of determination in current polarity. Further, compared to the conventional closed-loop current method, it is unnecessary for the present invention to detect the reactive current in advance, which is easily implemented, and is less affected by the detection error.

As compared to the prior art, the dead zone compensation circuit/method according to the present invention has the following advantages.

(1) The dead zone compensation circuit according to the present invention is provided preceding a modulation module, and thus applicable to any modulation manners (including SPWM, SVPWM, etc.).

(2) The dead zone compensation circuit/method according to the present invention is applicable to any dead zone time $t_d$.

(3) The dead zone compensation circuit/method according to the present invention is not dependent on the polarity of current output current, which avoids the difficulty in determination of the current polarity, and is not dependent on the accuracy of the zero-crossing detection.

(4) The dead zone compensation circuit/method according to the present invention does not need to perform a zone-divided determination depending on the three-phase current. Therefore, the processing method is uniformed, and is easily implemented.

(5) The dead zone compensation circuit/method according to the present invention may also suppress oscillations and fluctuations in the reactive current caused by other reasons.

Although the present invention has been described above with the embodiments, the present invention is not limited thereto. Any skilled person may make various changes and modifications without departing from spirit and substance of the present invention. Therefore, the extent of protection of the present invention shall be determined by the extent defined by the appended claims.

What is claimed is:

1. A dead zone compensation circuit for a three-phase frequency converter, comprising:
   a coordinate transformation module configured to perform a coordinate transformation on three-phase output currents of the three-phase frequency converter based on a given angle, for transforming the three-phase output currents from a three-phase static coordinate to a two-phase rotary coordinate so as to obtain a reactive current component of the three-phase output currents;
   a filter module configured to obtain a reactive current fluctuation amount, including:
      a low-pass filter for performing a low-pass filtering on the reactive current component to filter out noise in the reactive current component; and
      a high-pass filter for performing a high-pass filtering on the reactive current component to filter out a direct current part of the reactive current component;
   an error calculation module configured to calculate an error between the reactive current fluctuation amount and a zero value;
   a regulation and control module configured to regulate and control the reactive current fluctuation amount based on the error, for obtaining a voltage regulation variation; and
   a summing module configured to add the voltage regulation variation to a reference voltage, for obtaining a regulated voltage, the regulated voltage being used to generate a driving signal for the three-phase frequency converter.

2. The dead zone compensation circuit according to claim 1, further comprising:
   an angle compensation module for performing an angle compensation on a reference angle so as to obtain a compensated angle, the compensated angle being used as the given angle,
   wherein the coordinate transformation module performs the coordinate transformation based on the compensated angle.

3. The dead zone compensation circuit according to claim 1, wherein the regulation and control module includes a proportional control module for performing a proportional control on the reactive current fluctuation amount based on the error.

4. A three-phase frequency converter including the dead zone compensation circuit according to claim 1.

5. The dead zone compensation circuit according to claim 2, wherein the angle to be compensated by the angle compensation module is a difference between an angle of an instruction voltage vector and an angle of an actual output voltage vector of the three-phase frequency converter.

6. The three-phase frequency converter according to claim 4, further comprising a pulse width modulation module for performing a pulse width modulation on the regulated voltage and the given angle,
   wherein, after the modulation, the driving signal is outputted to a frequency converter main circuit module of the three-phase frequency converter.

7. The three-phase frequency converter according to claim 4, further comprising an integrator module for converting a reference frequency to the given angle.

8. The three-phase frequency converter according to claim 6, further comprising a frequency-voltage control module for converting a reference frequency to obtain the reference voltage.

9. A dead zone compensation method for a three-phase frequency converter, comprising:
   a coordinate transformation step for performing a coordinate transformation on three-phase output currents of the three-phase frequency converter based on a given angle, so as to transform the three-phase output currents from a three-phase static coordinate to a two-phase rotary coordinate, thereby obtaining a reactive current component in the three-phase output currents;
   a filtering step for performing a low-pass filtering and a high-pass filtering on the reactive current component so as to obtain a reactive current fluctuation amount;
   an error calculation step for calculating an error between the reactive current fluctuation amount and a zero value;

a regulation and control step for performing regulation and control on the reactive current fluctuation amount based on the error so as to obtain a voltage regulation variation; and a summing step for adding the voltage regulation variation to a reference voltage so as to obtain a regulated voltage, the regulated voltage being used to generate a driving signal for the three-phase frequency converter.

10. The dead zone compensation method according to claim 9, further comprising an angle compensation step before the coordinate transformation step, for performing an angle compensation on a reference angle so as to obtain a compensated angle, the compensated angle being used as the given angle, wherein the coordinate transformation is performed based on the compensated angle in the coordinate transformation step.

11. The dead zone compensation method according to claim 9, wherein the regulation and control module includes a proportional control module for performing a proportional control on the reactive current fluctuation amount based on the error.

12. The dead zone compensation method according to claim 10, wherein the angle to be compensated in the angle compensation step is a difference between an angle of an instruction voltage vector and an angle of an actual output voltage vector of the three-phase frequency converter.

\* \* \* \* \*